(12) United States Patent
Steele et al.

(10) Patent No.: US 11,873,549 B2
(45) Date of Patent: Jan. 16, 2024

(54) SHAPE MEMORY ALLOY PARTICLE TOUGHENING OF CAST OR ADDITIVE MANUFACTURED AL—CU—MG—AG—TIB2

(71) Applicant: GOODRICH CORPORATION, Charlotte, NC (US)

(72) Inventors: Leslie S. Steele, Dayton, OH (US); Tahany Ibrahim El-Wardany, Vernon, CT (US); Thomas P. Filburn, Granby, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/698,842

(22) Filed: Mar. 18, 2022

(65) Prior Publication Data

US 2022/0203436 A1   Jun. 30, 2022

Related U.S. Application Data

(62) Division of application No. 16/719,590, filed on Dec. 18, 2019, now abandoned.

(Continued)

(51) Int. Cl.
  *C22C 47/08* (2006.01)
  *C22F 1/00* (2006.01)
  (Continued)

(52) U.S. Cl.
  CPC .............. *C22C 47/08* (2013.01); *B22F 1/09* (2022.01); *B22F 3/17* (2013.01); *B22F 3/20* (2013.01);
  (Continued)

(58) Field of Classification Search
  CPC ......... C22C 47/08; C22C 49/06; C22C 21/00; C22C 47/062; C22C 47/064;
  (Continued)

(56) References Cited

U.S. PATENT DOCUMENTS 5,217,816 A   6/1993   Brupbacher et al.
5,508,116 A   4/1996   Barrett
(Continued)

FOREIGN PATENT DOCUMENTS

EP   2942412   11/2015
EP   3656491   5/2020
(Continued)

OTHER PUBLICATIONS

Furuya et al., "Enhanced Mechanical Properties of TiNi Shape Memory Fiber/Al Matrix Composite," 1993, Materials Transactions, JIM, vol. 34, No. 3, pp. 224-227 (Year: 1993).*

(Continued)

*Primary Examiner* — Sally A Merkling
*Assistant Examiner* — Dean Mazzola
(74) *Attorney, Agent, or Firm* — SNELL & WILMER L.L.P.

(57) ABSTRACT

A method of forming an aircraft component includes providing an aluminum alloy. The method further includes mixing a shape memory alloy (SMA) with the aluminum alloy to form a combination of the SMA and the aluminum alloy. The method further includes forming the aircraft component with the combination of the SMA and the aluminum alloy.

6 Claims, 4 Drawing Sheets

Related U.S. Application Data

(60) Provisional application No. 62/926,272, filed on Oct. 25, 2019.

(51) Int. Cl.

| | | |
|---|---|---|
| *B33Y 70/00* | (2020.01) | |
| *B33Y 80/00* | (2015.01) | |
| *C22C 21/00* | (2006.01) | |
| *C22C 49/06* | (2006.01) | |
| *B22F 3/17* | (2006.01) | |
| *B22F 3/20* | (2006.01) | |
| *B22F 3/22* | (2006.01) | |
| *B22F 5/12* | (2006.01) | |
| *B22F 7/08* | (2006.01) | |
| *B22F 1/00* | (2022.01) | |

(52) U.S. Cl.
CPC .................. *B22F 3/22* (2013.01); *B22F 5/12* (2013.01); *B22F 7/08* (2013.01); *C22C 21/00* (2013.01); *C22C 49/06* (2013.01); *C22F 1/006* (2013.01); *B22F 2301/052* (2013.01); *B22F 2998/10* (2013.01); *B33Y 70/00* (2014.12); *B33Y 80/00* (2014.12)

(58) Field of Classification Search
CPC ............... C22C 47/066; C22C 47/068; C22C 2047/205; B22F 1/09; B22F 3/17; B22F 3/20; B22F 3/22; B22F 5/12; B22F 7/08; B22F 2301/052; B33Y 70/00; B33Y 80/00; C22F 1/006; C22F 1/04; C22F 1/043; C22F 1/047; C22F 1/05; C22F 1/053; C22F 1/057; B22D 19/02; B22D 19/14; B22D 21/007

See application file for complete search history.

(56) References Cited

U.S. PATENT DOCUMENTS

| | | |
|---|---|---|
| 6,346,132 B1 | 2/2002 | Huber |
| 7,393,595 B2 | 7/2008 | Chandrasekaran et al. |
| 8,616,089 B2 | 12/2013 | Choe et al. |
| 2003/0194320 A1 | 10/2003 | Villhard |
| 2008/0029187 A1 | 2/2008 | Lin |
| 2019/0128072 A1 | 5/2019 | Griffo et al. |
| 2020/0164963 A1* | 5/2020 | da Silva ................ C21D 6/004 |

FOREIGN PATENT DOCUMENTS

| | | |
|---|---|---|
| GB | 2477744 | 8/2011 |
| WO | 2007111634 | 10/2007 |

OTHER PUBLICATIONS

USPTO; Pre-Interview First Office Action dated Oct. 4, 2021 in U.S. Appl. No. 16/719,590.
European Patent Office, European Search Report dated Apr. 26, 2021 in Application No. 20197820.2.
Wei Z G et al, "Design and Fabrication of Intelligent Composites Based On Shape Memory Alloys", Journal of Materials Processing Technology, Elsevier, NL, vol. 69, No. 1-03, Jan. 1, 1997 (Jan. 1, 1997), pp. 68-74, XP001145535, ISSN: 0924-0136, DOI: 10.1016/S0924-0136(96)00041-6.
Young-Ch Ul Park et al, "Fatigue design curve of a TiNi/Al shape memory alloy composite for aircraft stringer design", Smart Materials and Structures, IOP Publishing Ltd., Bristol, GB, vol. 18, No. 5, May 1, 2009 (May 1, 2009), p. 55009, XP020153600, ISSN: 0964-1726, DOI: 10.1088/0964-1726/18/5/055009.
Porter Ga et al: "Ni—Ti SMA-Reinforced Al Composites", JOM: Journal of Metals, Springer New York LLC, United States, vol. 52, No. 10, Oct. 1, 2000 (Oct. 1, 2000), pp. 52-56, XP001145785, ISSN: 1047-4838, DOI: 10.1007/S11837-000-0084-2.
USPTO, Requirement for Restriction/Election dated Jun. 4, 2021 in U.S. Appl. No. 16/719,590.
USPTO, First Action Interview Office Action dated Dec. 30, 2021 in U.S. Appl. No. 16/719,590.
European Patent Office, European Office Action dated Sep. 21, 2023 in Application No. 20197820.2.
Shishkovsky, et al. "Metal matrix composites with ternary intermetallic inclusions fabricated by laser direct energy deposition", Composite Structuress, vol. 183, dated Sep. 14, 2017, pp. 663-670, DOI: 10.1016/J.COMPSTRUCT.
Hahnlen et al, "NiTi-Al interface strength in ultrasonic additive manufacturing composites", Composites: Part B, vol. 59, dated Dec. 9, 2013, pp. 101-108.

* cited by examiner

SHAPE MEMORY ALLOY PARTICLE TOUGHENING OF CAST OR ADDITIVE MANUFACTURED AL—CU—MG—AG—TIB2

This application is a divisional of, and claims priority to, and the benefit of Non-Provisional application Ser. No. 16/719,590, filed Dec. 18, 2019 for SHAPE MEMORY ALLOY PARTICLE TOUGHENING OF CAST OR ADDITIVE MANUFACTURED AL-CU-MG-AG-TIB2. The '590 application claims the benefits of provisional application Ser. No. 62/926,272, filed Oct. 25, 2019 for SHAPE MEMORY ALLOY PARTICLE TOUGHENING OF CAST OR ADDITIVE MANUFACTURED AL-CU-MG-AG-TIB2. All of which are incorporated in their entirety by reference herein for all purposes.

FIELD

The present disclosure relates to aluminum alloys for use in aircraft components and, more particularly, to aluminum alloys formed to have improved elongation, ductility, and fracture resistance properties.

BACKGROUND

Many aircraft include various components such as landing gear having wheel assemblies to allow the aircraft to travel along the ground during taxi, takeoff, and landing. It is desirable for such aircraft components to have a relatively large tensile strength and to be relatively lightweight. Aluminum and aluminum alloys may provide desirable combinations of material strength and relatively low weight. However, such aluminum alloys may have some undesirable characteristics such as relatively low elongation properties, relatively low ductility, and relatively low fracture resistance.

SUMMARY

Disclosed herein is a method of forming an aircraft component. The method includes mixing a shape memory alloy (SMA) with an aluminum alloy to form a combination of the SMA and the aluminum alloy. The method further includes forming the aircraft component with the combination of the SMA and the aluminum alloy.

In any of the foregoing embodiments, the aluminum alloy includes aluminum (Al), copper (Cu), magnesium (Mg), silver (Ag), titanium (Ti), and boron (B).

In any of the foregoing embodiments, the aluminum alloy is Al—Cu—Mg—Ag—TiB2.

In any of the foregoing embodiments, the SMA includes a nickel titanium alloy.

In any of the foregoing embodiments, forming the aircraft component includes forming the aircraft component using at least one of casting, forging, powder metal, extrusion, or additive manufacturing.

In any of the foregoing embodiments, mixing the SMA with the aluminum alloy includes at least one of mixing particles of the SMA in powder form with particles of the aluminum alloy in powder form or mixing the SMA in the powder form with liquid aluminum alloy.

In any of the foregoing embodiments, mixing the SMA with the aluminum alloy includes: providing the SMA in wire form having a length that is less than 0.0197 inches; retaining the SMA in the wire form in a single location; melting the aluminum alloy; and pouring the aluminum alloy over the SMA in the wire form.

In any of the foregoing embodiments, mixing the SMA with the aluminum alloy includes: melting the aluminum alloy; and mixing the SMA with the aluminum alloy during the melting of the aluminum alloy.

In any of the foregoing embodiments, the combination of the SMA and the aluminum alloy includes between 0.1 percent (0.1%) and 18% of the SMA by volume.

Also disclosed is a method of forming an aircraft component. The method includes mixing a shape memory alloy (SMA) an aluminum alloy including aluminum (Al), copper (Cu), magnesium (Mg), silver (Ag), titanium (Ti), and boron (B); to form a combination of the SMA and the aluminum alloy, the SMA including a nickel titanium alloy. The method further includes forming the aircraft component with the combination of the SMA and the aluminum alloy.

In any of the foregoing embodiments, mixing the SMA with the aluminum alloy includes at least one of mixing particles of the SMA in powder form with particles of the aluminum alloy in powder form or mixing the SMA in the powder form with liquid aluminum alloy.

In any of the foregoing embodiments, mixing the SMA with the aluminum alloy includes: providing the SMA in wire form having a length that is less than 0.0197 inches; retaining the SMA in the wire form in a single location; melting the aluminum alloy; and pouring the aluminum alloy over the SMA in the wire form.

In any of the foregoing embodiments, the combination of the SMA and the aluminum alloy includes between 0.1 percent (0.1%) and 18% of the SMA by volume.

Also disclosed is an aircraft component. The component includes an aluminum alloy. The component further includes a shape memory alloy (SMA) mixed together with the aluminum alloy to form a combination of the SMA and the aluminum alloy.

In any of the foregoing embodiments, the aluminum alloy includes aluminum (Al), copper (Cu), magnesium (Mg), silver (Ag), titanium (Ti), and boron (B).

In any of the foregoing embodiments, the aluminum alloy is Al—Cu—Mg—Ag—TiB2.

In any of the foregoing embodiments, the SMA includes a nickel titanium alloy.

In any of the foregoing embodiments, the SMA is provided in powder form and the aluminum alloy is provided in powder form, and the SMA and the aluminum alloy are combined while both in the powder form.

In any of the foregoing embodiments, the SMA is provided in wire form having a length that is less than 0.0197 inches and the aluminum alloy is combined with the SMA while the aluminum alloy is melted.

In any of the foregoing embodiments, the combination of the SMA and the aluminum alloy includes between 0.1 percent (0.1%) and 18% of the SMA by volume.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when con

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
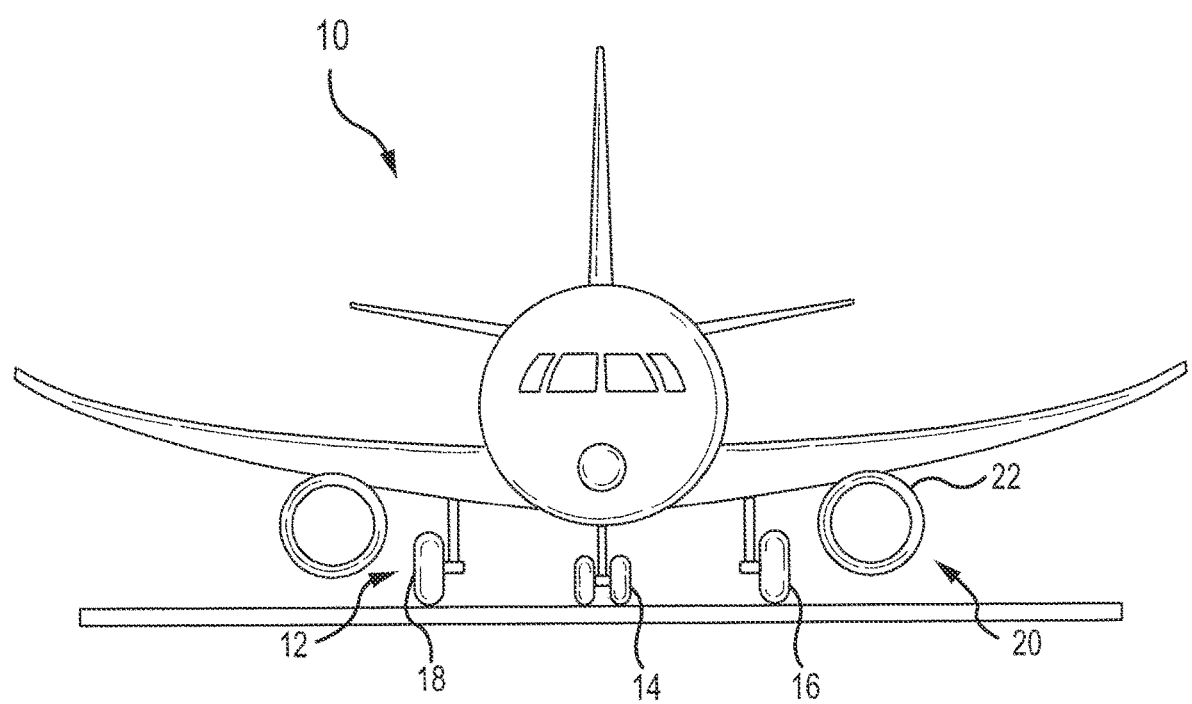
- FIG. 1 illustrates an aircraft having multiple landing gear, in accordance with various embodiments.

Referring now to FIG. 1, an aircraft 10 in accordance with various embodiments can include multiple landing gear including a first landing gear 12, a second landing gear 14, and a third landing gear 16. In various embodiments, the first landing gear 12 and the third landing gear 16 may be main landing gear and the second landing gear 14 may be a nose landing gear. Each landing gear may include one or more wheel and brake assemblies. For example, the first landing gear 12 includes a wheel and brake assembly 18. The landing gear 12, 14, 16 and the wheel and brake assembly 18 support the aircraft 10 in response to the aircraft 10 being parked and during taxi, takeoff, and landing of the aircraft 10.

The aircraft 10 may further include one or more gas turbine engine 20. The gas turbine engine 20 may be controlled by a pilot (such as by controlling a throttle in a cockpit) to generate thrust to accelerate the aircraft 10. The gas turbine engine 20 may include a nacelle 22.

Any of the landing gear 12, 14, 16 (including corresponding wheel and brake assemblies 18 and any components therein, such as piston housings), the gas turbine engine 20 (including the nacelle 22), and any other component of the aircraft 10 may include an aluminum alloy. Aluminum alloys may exhibit desirable characteristics in aircraft components due to their relatively light weight and relatively great tensile strength. However, such aluminum alloys may include undesirable characteristics such as relatively low ductility, fracture resistance, and elongation. Relatively great ductility, fracture resistance, and elongation may be desirable in certain situations such as in response to a bird strike. For example, it may be desirable for the wheel and brake assembly 18 to return to an original form after striking a bird. In that regard, the present disclosure reveals systems and methods for forming aluminum alloys that include a shape memory alloy (SMA) which provides improved ductility, fracture resistance, and elongation. The components of the aircraft 10 may include a combined alloy including aluminum alloy and SMA. In that regard, the components may include either a combination alloy that includes both aluminum and SMA or a combination of an aluminum alloy or magnesium alloy and a SMA that have not been alloyed together.

Figure 2:
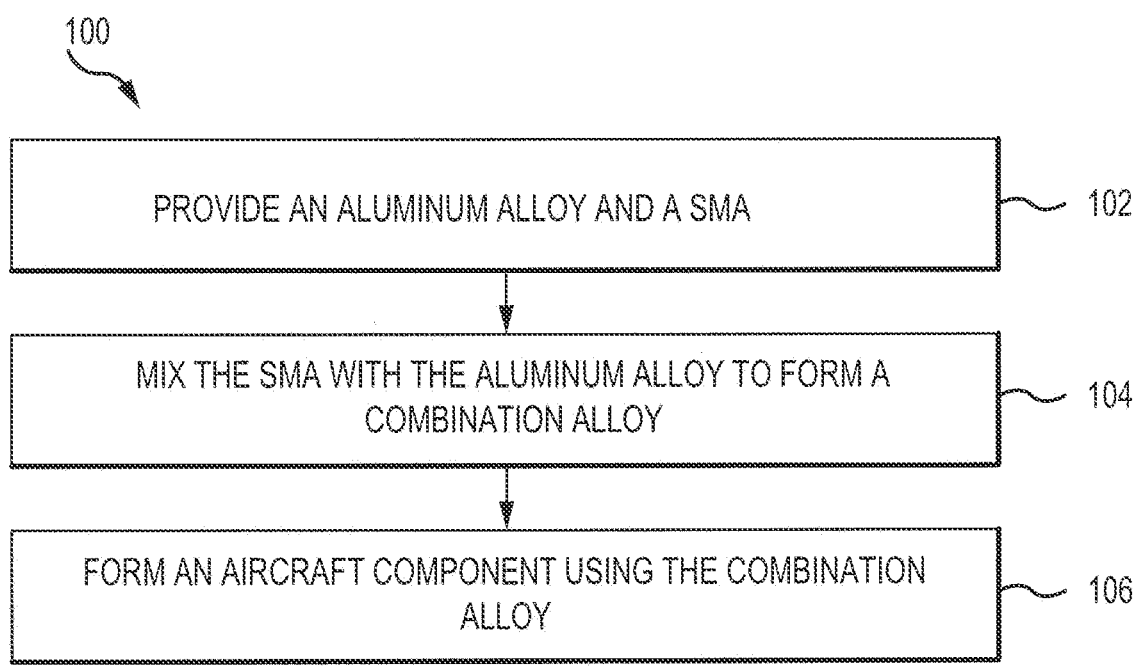
FIG. 2 illustrates a method of forming an aircraft component with a combined alloy having an aluminum alloy and a shape memory alloy, in accordance with various embodiments.

Referring now to FIG. 2, a method 100 forming an aircraft component to have a relatively great tensile strength, ductility, fracture resistance, and elongation is shown. The method begins in block 102 where an aluminum alloy is provided. The aluminum alloy may include an alpha-phase with presence of strengthening phases; theta-prime-phase and or the Al—Mg—Si—Cu quaternary or so called "Q-phase", or any other strengthening phases. The aluminum alloy may be a relatively high-strength aluminum alloy such as an aluminum alloy including aluminum (Al), copper (Cu), magnesium (Mg), silver (Ag), titanium (Ti), and boron (B) (e.g., Al—Cu—Mg—Ag—TiB2). Example cast aluminum alloys may conform to SAE Aerospace Materials standards, and/or registered with the Aluminum Association including aluminum A205, 355, or A356 aluminum alloys, including other cast alloys 2XX or 3XX series aluminum cast alloys. Wrought aluminum alloys may conform to standards set by SAE Aerospace Materials standards, and/or registered with the Aluminum Association including aluminum 6061, 2014, 2040, or 7050 aluminum alloys, including other 6XXX, 2XXX, or 7XXX series aluminum alloys, or the like. The aluminum alloy may be provided in any form such as a powder form, a solid form, a molten form, or the like.

A SMA may also be provided in block 102. The SMA may include any SMA such as a nickel titanium alloy available under the trade name Nitinol and available from Memry Corporation of Bethel, CT The SMA may be provided in any form such as a powder form (including a short fiber form or particulate form) or a wire form.

Figure 3A:
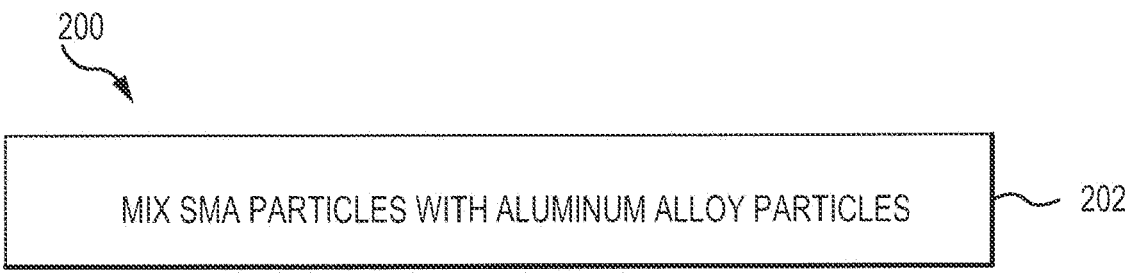
FIG. 3A illustrates a method of mixing an aluminum alloy with a shape memory alloy, in accordance with various embodiments.

In block 104, the SMA may be mixed with the aluminum alloy to form a combination alloy. For example and referring to FIG. 3A, a method 200 provides an example of mixing a SMA with an aluminum alloy. The method 200 corresponds to a method of mixing powdered SMA with powdered aluminum alloy. In block 202, the particles of the SMA may be mixed with the particles of the aluminum alloy. Because both the SMA and the aluminum alloy are powdered, the particles may be blended together using any known method, such as a powder blender (e.g., a V-cone blender). In various embodiments, the aluminum alloy may be melted and then the SMA particles may be added to the molten aluminum alloy. Because many SMA materials have a greater melting temperature than aluminum alloys, adding the SMA particles to the molten aluminum alloy may desirably fail to melt the SMA particles (or fiber particulates).

Figure 3B:
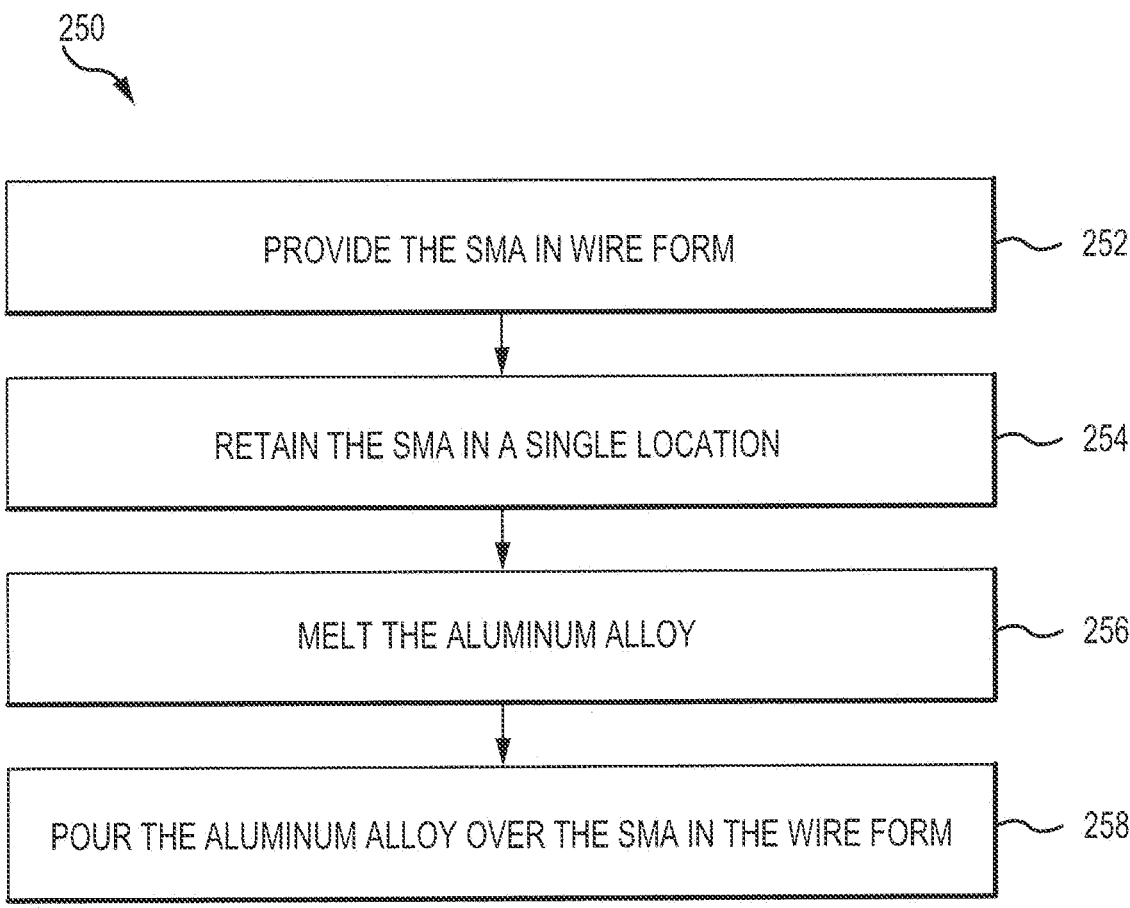
FIG. 3B illustrates a method of mixing an aluminum alloy with a shape memory alloy, in accordance with various embodiments.

Referring to FIG. 3B, another method 250 provides an example of mixing SMA in wire form with an aluminum alloy. In block 252, the SMA may be provided in a wire form. The wire form may include single-strands of SMA wires, multiple strands of SMA wires coupled together, a mesh of SMA wires, particulates of SMA fibers, cut SMA wire particulates, or the like. The SMA wires may be purchased in wire form or may be formed to have the wire form. In various embodiments, each of the wires of the SMA may have a length that is less than 0.0197 inches (0.5 millimeters). In that regard, the wires of the SMA may be chopped and may thus be referred to as chopped SMA wire.

In block 254, the SMA may be retained in a single location. For example, the SMA may be retained in a cast. As part of block 254, the SMA may be reduced or otherwise reshaped to have a shape of the resulting aircraft component. For example, the SMA wires may be placed in a cast and excess wire may be cut such that the SMA wires are located only within the cast. The SMA wires may be held in place using any technique such as an adhesive, a clamp, or the like. In various embodiments, the cast may retain the SMA wires in place due to a cavity shape within the cast.

In block 256, the aluminum alloy may be melted to a liquid form. For example, the aluminum alloy may be heated to its melting temperature to cause it to liquefy.

In block 258, the aluminum alloy may be poured over the SMA wires, thus mixing the aluminum alloy with the SMA wires. SMA typically has a greater melting temperature than aluminum alloys. In that regard, pouring the melted aluminum alloy over the SMA wires is unlikely to melt or otherwise deform the SMA wires. Thus, the SMA wires retain their original shape within the melted (and later re-solidified) aluminum alloy. The SMA particulates may be added directly to the castingmelt with the aid of various mixing techniques for uniform distribution such as mold rotation or spinning.

Returning reference to FIG. 2, the SMA and the aluminum alloy may be mixed to have a specific percentage by volume of the SMA. For example, the combination alloy may have between 0.1% and 18% SMA by volume or between 0.1% and 15% SMA by volume, or the like. In various embodiments, the combination alloy may have up to 25% SMA by volume, although it may be desirable to limit the value to 18% SMA by volume.

In block 106, an aircraft component may be formed using the combination alloy. For example, if the combination alloy includes powdered aluminum alloy and powdered SMA, the combination alloy may be melted (e.g., by heating to the melting temperature of the aluminum alloy or to the SMA) and then maybe cast, forged, extruded, or the like into the aircraft component. As another example of forming the aircraft component using a powdered combination alloy, the powder mixture may be used in additive manufacturing to form the component.

If the combination alloy includes the wire SMA and the molten aluminum alloy, the aircraft component may be formed by the mixing step (i.e., by pouring the aluminum alloy into the cast with the wire SMA or the chopped wire SMA). In various embodiments, the aluminum alloy may be mixed with the wire SMA to form a block or other shape, and the block or other shape may be reduced to the final aircraft component.

Figure 4:
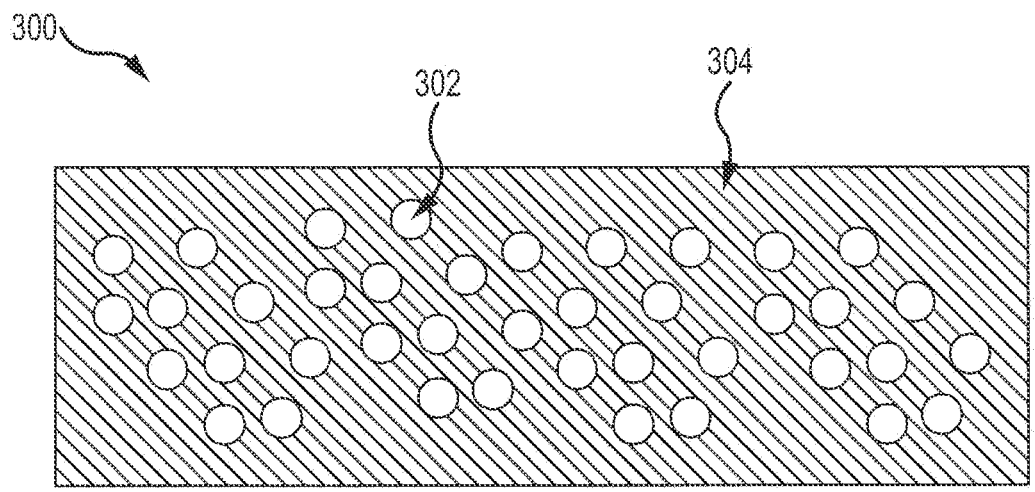
FIG. 4 illustrates an aircraft component having a combined alloy with an aluminum alloy and a shape memory alloy, in accordance with various embodiments.

Turning now to FIG. 4, an aircraft component 300 is shown. The aircraft component 300 may include SMA particles 302 and an aluminum alloy 304. The SMA particles 302 may have been provided in powder form and may have been mixed with molten or powdered aluminum alloy 304. The mixture may have been formed into the aircraft component 300 such as by additive manufacturing, casting, forging, powder metal forging, extrusion, or the like.

Figure 5:
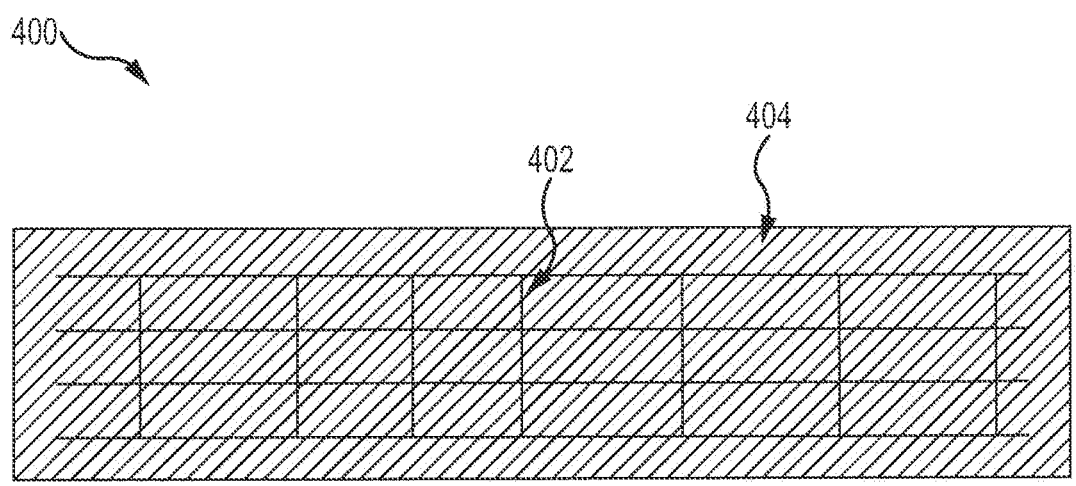
FIG. 5 illustrates an aircraft component having a combined alloy with an aluminum alloy and a shape memory alloy, in accordance with various embodiments.

Referring now to FIG. 5, another aircraft component 400 is shown. The aircraft component 400 may include SMA wires 402 and an aluminum alloy 404. The SMA wires 402 may have been provided in wire form or chopped wire form and may have been mixed with molten aluminum alloy 404. For example, the SMA wires 402 may have been held in place within a casting having a shape corresponding to the aircraft component 400 and the molten aluminum alloy 404 may have been poured into the cast and around the SMA wires 402. In various embodiments, the SMA wires 402 may be welded together to form a wire mesh. In various embodiments, the molted aluminum alloy 404 may have been mixed with chopped SMA wires before being poured into the cast. In various embodiments, the SMA wires 402 may be formed using additive manufacturing. For example, the entire mesh of SMA wires 402 may be formed using additive manufacturing.

The systems, methods, and aircraft components disclosed herein provide various benefits and advantages over conventional systems, methods, and aircraft components. For example, addition of the SMA increases elongation, ductility, and fracture resistance relative to aluminum alloys without SMA. This results in an increase in fracture toughness from single-digit values to double-digit values. This further reduces, slows, or eliminates crack propagation through a resulting aircraft component due to the phenomenon of crack bridging, whereas the fracture resistance increases with increasing crack extension. This is typically characterized by R-curve testing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of forming an aircraft component, the method comprising:
    mixing a shape memory alloy (SMA) with an aluminum alloy to form a combination of the SMA and the aluminum alloy, wherein mixing the SMA with the aluminum alloy includes:
        providing the SMA in a wire form having a length that is less than 0.0197 inches,
        retaining the SMA in the wire form in a single location,
        melting the aluminum alloy, and
        pouring the aluminum alloy over the SMA in the wire form; and
    forming the aircraft component with the combination of the SMA and the aluminum alloy, wherein the aluminum alloy is Al—Cu—Mg—Ag—TiB2.

2. The method of claim 1, wherein the SMA includes a nickel titanium alloy.

3. The method of claim 1, wherein forming the aircraft component includes forming the aircraft component using at least one of casting, powder metal, forging, extrusion, or additive manufacturing.

4. The method of claim 1, wherein the combination of the SMA and the aluminum alloy includes between 0.1 percent (0.1%) and 18% of the SMA by volume.

5. The method of claim 1, wherein the forming the aircraft component is via additive manufacturing.

6. The method of claim 1, wherein the retaining the SMA in the wire form in a single location includes retaining the SMA in a cast.

* * * * *